UNITED STATES PATENT OFFICE.

ADOLPH BUCHTEN, OF SAN FRANCISCO, CALIFORNIA, ASSIGNOR OF ONE-HALF TO CHARLES HUSBAND, OF SAME PLACE.

COMPOSITION FOR REMOVING INK.

SPECIFICATION forming part of Letters Patent No. 342,279, dated May 18, 1886.

Application filed June 20, 1885. Serial No. 169,313. (Specimens.)

*To all whom it may concern:*

Be it known that I, ADOLPH BUCHTEN, a citizen of the United States, residing in the city and county of San Francisco, State of California, have invented a new and useful Composition of Matter—one that is permanent in its properties and effects—to be used for the removal and erasure of writing-inks or writing-fluids from paper, cloth, and all other substances which writing fluids or inks may come in contact with without injury to the said paper or other substance, of which the following is a specification.

This invention has relation to improvements in compounds for the removal of writing-inks and writing-fluids from paper, cloth, and the like; and it consists in the ingredients combined in the manner hereinafter described and claimed.

The composition consists of the following ingredients, viz: four quarts of water, four ounces of citric acid, twelve to sixteen ounces of strong solution of borax, three-quarters pound of chloride of lime.

In carrying out my invention I first take two quarts of water which has been previously boiled and cooled. I then add four ounces of citric acid, and after the same has been dissolved I strain and add from six to eight ounces of strong solution of borax, after which the whole may be put in a bottle or suitable receptacle. I then take two quarts of water which has been previously boiled and cooled, add thereto three-quarters pound of chloride of lime. I then shake the whole well and let it stand from four to six days, after which I strain, add from six to eight ounces of strong solution of borax, and place the whole in a separate bottle.

When it is desired to remove ink from paper, cloth, or other absorbent substance, I first apply thereto the composition as placed in bottle No. 1, or that first described, so as to thoroughly saturate the place occupied by the ink, a blotter being used to absorb all waste moisture. I then apply the last-described composition, or that placed in the second bottle. By the combined use of the two fluids thus described, writing-inks or other writing-fluids will be immediately dissolved and removed from paper, so that the latter may be again written on.

Having described this invention, what I claim is—

The composition of matter herein described, consisting of water, citric acid, borax, and chloride of lime, combined and used in the manner substantially as specified.

ADOLPH BUCHTEN.

Witnesses:
H. W. HUTTON,
CHAS. HUSBAND.